US012812548B2

(12) United States Patent
Zhang et al.

(10) Patent No.: US 12,812,548 B2
(45) Date of Patent: Nov. 24, 2026

(54) POWER ALLOCATION METHOD AND APPARATUS

(71) Applicant: 1FINITY Inc., Kawasaki (JP)

(72) Inventors: Jian Zhang, Beijing (CN); Pengyu Ji, Beijing (CN); Guorong Li, Beijing (CN); Lei Zhang, Beijing (CN); Xin Wang, Beijing (CN)

(73) Assignee: 1FINITY Inc., Kawasaki (JP)

(*) Notice: Subject to any disclaimer, the term of this patent is extended or adjusted under 35 U.S.C. 154(b) by 442 days.

(21) Appl. No.: 17/731,495

(22) Filed: Apr. 28, 2022

(65) Prior Publication Data

US 2022/0256470 A1 Aug. 11, 2022

Related U.S. Application Data

(63) Continuation of application No. PCT/CN2019/116614, filed on Nov. 8, 2019.

(51) Int. Cl.
*H04W 52/14* (2009.01)
*H04W 52/28* (2009.01)
*H04W 52/36* (2009.01)

(52) U.S. Cl.
CPC ........... *H04W 52/14* (2013.01); *H04W 52/28* (2013.01); *H04W 52/367* (2013.01)

(58) Field of Classification Search
None
See application file for complete search history.

(56) References Cited

U.S. PATENT DOCUMENTS

| | | | |
|---|---|---|---|
| 11,057,870 | B2 | 7/2021 | Huang et al. |
| 2019/0124015 | A1 | 4/2019 | Loehr et al. |
| 2020/0015176 | A1 | 1/2020 | Li et al. |
| 2020/0022161 | A1 | 1/2020 | Yang et al. |
| 2020/0099476 | A1 | 3/2020 | Park |
| 2020/0267597 | A1 | 8/2020 | Huang et al. |
| 2020/0313805 | A1 | 10/2020 | Park |
| 2021/0136781 | A1 | 5/2021 | Hosseini et al. |

(Continued)

FOREIGN PATENT DOCUMENTS

| | | |
|---|---|---|
| CN | 108696896 A | 10/2018 |
| CN | 108696935 A | 10/2018 |

(Continued)

OTHER PUBLICATIONS

U.S. Appl. No. 62/911,359, filed Oct. 6, 2019, Lee; Seungmin.*

(Continued)

*Primary Examiner* — Kouroush Mohebbi
(74) *Attorney, Agent, or Firm* — Myers Wolin, LLC

(57) ABSTRACT

A power allocation method and apparatus. The method includes: a terminal equipment determines whether sidelink transmission has precedence over uplink transmission, the sidelink transmission including transmission of sidelink information carried by a second uplink physical channel and/or transmission of a sidelink physical channel/signal, the uplink transmission including transmission of uplink information carried by the second uplink physical channel and/or transmission of a first uplink physical channel/signal; and allocates power preferentially for the second uplink physical channel and/or the sidelink physical channel/signal when the sidelink transmission has precedence over the uplink transmission.

20 Claims, 8 Drawing Sheets

(56) References Cited

U.S. PATENT DOCUMENTS

| | | | | |
|---|---|---|---|---|
| 2021/0168790 | A1 | 6/2021 | Li et al. | |
| 2021/0321396 | A1 | 10/2021 | Li et al. | |
| 2022/0264559 | A1 * | 8/2022 | Lee | H04W 74/0833 |
| 2022/0304001 | A1 | 9/2022 | Lee et al. | |
| 2022/0368461 | A1 | 11/2022 | Zhang et al. | |
| 2022/0394700 | A1 | 12/2022 | Ko et al. | |
| 2023/0057942 | A1 | 2/2023 | Zhang et al. | |

FOREIGN PATENT DOCUMENTS

| | | | | |
|---|---|---|---|---|
| CN | 108811138 | A | 11/2018 | |
| CN | 109314841 | A | 2/2019 | |
| CN | 110677905 | A | 1/2020 | |
| CN | 110856192 | A * | 2/2020 | H04L 5/0053 |
| CN | 110944390 | A | 3/2020 | |
| CN | 110944403 | A | 3/2020 | |
| CN | 111095834 | A | 5/2020 | |
| EP | 3 634 061 | A1 | 4/2020 | |
| WO | WO-2018074876 | A1 * | 4/2018 | H04W 4/40 |
| WO | 2018/175553 | A1 | 9/2018 | |
| WO | 2019/069234 | A1 | 4/2019 | |

OTHER PUBLICATIONS

3GPP TSG RAN WG1 #100, Remaining issues of mode 1 resource allocation for NR-V2X, R1-2000490 (Year: 2020).*

3GPP TSG RAN WG1 #100bis-e, Remaining issues of mode 1 operation on sidelink, R1-2001895, (Year: 2020).*

International Search Report and Written Opinion of the International Searching Authority issued by the China National Intellectual Property Administration for corresponding International Patent Application No. PCT/CN2019/116614, mailed on Jul. 13, 2020, with an English translation.

OPPO (rapporteur), "Summary of [106#77] UL/SL prioritization", Agenda Item 11.4.2, 3GPP TSG-RAN WG2 Meeting #107, R2-1908717, Prague, Czech Republic, Aug. 26-30, 2019.

International Search Report issued by China National Intellectual Property Administration for corresponding International Patent Application No. PCT/CN2020/090380, mailed on Jan. 28, 2021, with an English translation.

Notice of Reasons for Refusal issued by the Japan Patent Office for corresponding Japanese Patent Application No. 2022-567132, mailed on Oct. 31, 2023, with an English translation.

First Notification of Office Action and Search Report issued by the China National Intellectual Property Administration for corresponding Chinese Patent Application No. 202080099888.2, mailed on Dec. 21, 2023, with an English translation.

The Extended European search report with the Supplementary European search report and the European search opinion, issued by the European Patent Office for corresponding European Patent Application No. 20935330.9, mailed on Jun. 6, 2023.

OPPO, "Remaining issues of mode 1 resource allocation for NR-V2X", Agenda Item: 7.2.4.2.1, 3GPP TSG-RAN WG1 #100, R1-2000490, e-Meeting, Feb. 24-Mar. 6, 2020.

CMCC, "Remaining issues on mode-1 resource allocation mechanism", Agenda Item: 7.2.4.2.1, 3GPP TSG-RAN WG1 Meeting #100bis, R1-2002205, e-Meeting, Apr. 20-30, 2020.

ZTE et al., "Remaining issues of mode 1 operation on sidelink", Agenda Item: 7.2.4.2.1, 3GPP TSG-RAN WG1 #100bis-e, R1-2001895, e-Meeting, Apr. 20-30, 2020.

LG Electronics, Inc. (Rapporteur), "Report of [Post109e#21][V2X] Remaining MAC issues (LG)", Agenda Item: 6.4.3.1, 3GPP TSG-RAN WG2 Meeting #109B-e, R2-2003522, Online, Feb. 24-Mar. 6, 2020.

Lenovo et al., "Discussion on resource allocation for NR sidelink Mode 1", Agenda Item: 7.2.4.2.1, 3GPP TSG-RAN WG1 Meeting #98bis, R1-1910145, Chongqing, China, Oct. 14-20, 2019.

Non-Final Office Action issued by the USPTO for corresponding U.S. Appl. No. 17/981,334, mailed on Dec. 24, 2024.

Notice of Preliminary Rejection issued by the Korean Intellectual Property Office for corresponding Korean Patent Application No. 10-2022-7038879, mailed on May 13, 2025, with an English translation.

The First Examination Report issued by the Indian Patent Office for corresponding Indian Patent Application No. 202237062268, mailed on Jun. 8, 2026, with English translation.

* cited by examiner

POWER ALLOCATION METHOD AND APPARATUS

CROSS-REFERENCE TO RELATED APPLICATION

This application is a continuation application of International Application PCT/CN2019/116614 filed on Nov. 8, 2019 and designated the U.S., the entire contents of which are incorporated herein by reference.

TECHNICAL FIELD

This disclosure relates to the field of communication technologies.

BACKGROUND

V2X (Vehicle to Everything) is a vehicle communication technology. Compared with the cellular communication using Uu links (including uplink and downlink), a transmitting terminal equipment of V2X communicates directly with a receiving terminal equipment via a sidelink.

New Radio (NR) V2X is an important project of 5G NR. Compared with Long Term Evolution (LTE) V2X, NR V2X needs to support various new scenarios and new services, and needs to meet higher technical indicators.

NR V2X defines several physical channels, including a physical sidelink control channel (PSCCH), a physical sidelink shared channel (PSSCH) and a physical sidelink feedback channel (PSFCH), which are respectively used for carrying sidelink control information (SCI), sidelink data and sidelink feedback information (such as HARQ-ACK).

The SCI is used to schedule the PSSCH, and the SCI indicates a priority of the PSSCH, the priority being a priority of a PSFCH associated with the PSSCH. There exists a predetermined mapping relationship between PSCCH/PSSCH time-frequency resources and PSFCH time-frequency resources associated therewith. After transmitting a PSCCH/PSSCH, the transmitting terminal equipment may learn a slot at which a PSFCH associated with the PSSCH is received.

NR V2X defines two operating modes. For NR V2X mode 1, time-frequency resources used by the terminal equipment for V2X communication are scheduled and allocated by a network device (such as a base station) via an NR Uu link, and for NR V2X mode 2, the terminal equipment may select time-frequency resources for V2X communication on its own based on a sensing result.

For Mode 1, the terminal equipment may transmit sidelink HARQ-ACK to the network device. More specifically, the terminal equipment may carry the sidelink HARQ-ACK on a physical uplink control channel (PUCCH) or a physical uplink shared channel (PUSCH) and transmit it to the network device, and the sidelink HARQ-ACK may be multiplexed with Uu information in the PUCCH or PUSCH. And the network device may learn whether it is needed to allocate time-frequency resources for the sidelink according to the sidelink HARQ-ACK.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY

It was found by the inventors that for an NR Uu link, when a terminal equipment performs uplink transmission simultaneously on multiple uplink carriers, it will preferentially allocate power to a physical channel or physical signal with a higher priority, so as to ensure that total power does not exceed a maximum power limit of the terminal equipment. However, if an existing Uu power allocation priority rule is used, it will lead to unfair power allocation results in NR V2X.

Addressed to at least one of the above problems, embodiments of this disclosure provide a power allocation method and apparatus.

According to an aspect of the embodiments of this disclosure, there is provided a power allocation apparatus, including:

a determining unit configured to determine whether sidelink transmission has precedence over uplink transmission, the sidelink transmission including transmission of sidelink information carried by a second uplink physical channel and/or transmission of a sidelink physical channel/signal, the uplink transmission including transmission of uplink information carried by the second uplink physical channel and/or transmission of a first uplink physical channel/signal carrying no sidelink information; wherein the second uplink physical channel at least carries sidelink information, the second uplink physical channel, the first uplink physical channel/signal and the sidelink physical channel/signal overlap in a time domain; and an allocating unit configured to allocate power preferentially for the second uplink physical channel and/or the sidelink physical channel/signal when the sidelink transmission has precedence over the uplink transmission.

According to another aspect of the embodiments of this disclosure, there is provided a power allocation method, including:

determining by a terminal equipment whether sidelink transmission has precedence over uplink transmission, the sidelink transmission including transmission of sidelink information carried by a second uplink physical channel and/or transmission of a sidelink physical channel/signal, the uplink transmission including transmission of uplink information carried by the second uplink physical channel and/or transmission of a first uplink physical channel/signal carrying no sidelink information; wherein the second uplink physical channel at least carries sidelink information, the second uplink physical channel, the first uplink physical channel/signal and the sidelink physical channel/signal overlap in a time domain; and allocating power preferentially for the second uplink physical channel and/or the sidelink physical channel/signal when the sidelink transmission has precedence over the uplink transmission.

According to a further aspect of the embodiments of this disclosure, there is provided a communication system, including:

a terminal equipment configured to determine whether sidelink transmission has precedence over uplink transmission, the sidelink transmission including transmission of sidelink information carried by a second uplink physical channel and/or transmission of a sidelink physical channel/signal, the uplink transmission including transmission of uplink information carried by the second uplink physical channel and/or transmission of a first uplink physical channel/signal carrying no sidelink information; the second uplink physical channel at least carries sidelink information, the second uplink physical channel, the first uplink physical channel/signal and the sidelink physical channel/signal overlap in a time domain; and allocate power preferentially for the second uplink physical channel and/or the sidelink physical channel/signal when the sidelink transmission has precedence over the uplink transmission.

An advantage of the embodiments of this disclosure exists in that the terminal equipment preferentially allocates power to the second uplink physical channel at least carrying the sidelink information when the sidelink transmission has precedence over the uplink transmission. Therefore, when the terminal equipment feeds back information to the network device, fairness of power allocation may be ensured, so that power may be preferentially allocated to the physical channel or physical signal with the most urgent demand or the highest degree of importance.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term “comprise/include” when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiments.

DETAILED DESCRIPTION

Figure 1:
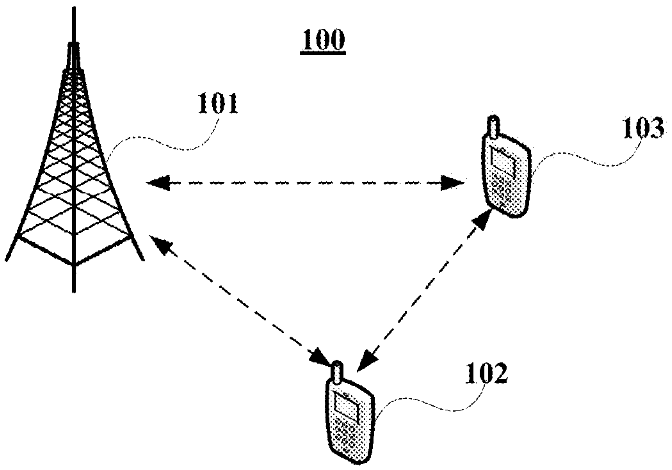
FIG. 1 is schematic diagram of a communication system of an embodiment of this disclosure.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

In the embodiments of this disclosure, terms “first”, and “second”, etc., are used to differentiate different elements with respect to names, and do not indicate spatial arrangement or temporal orders of these elements, and these elements should not be limited by these terms. Terms “and/or” include any one and all combinations of one or more relevantly listed terms. Terms “contain”, “include” and “have” refer to existence of stated features, elements, components, or assemblies, but do not exclude existence or addition of one or more other features, elements, components, or assemblies.

In the embodiments of this disclosure, single forms “a”, and “the”, etc., include plural forms, and should be understood as “a kind of” or “a type of” in a broad sense, but should not defined as a meaning of “one”; and the term “the” should be understood as including both a single form and a plural form, except specified otherwise. Furthermore, the term “according to” should be understood as “at least partially according to”, the term “based on” should be understood as “at least partially based on”, except specified otherwise.

In the embodiments of this disclosure, the term “communication network” or “wireless communication network” may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (genescalen), 2G, 2.5G, 2.75G, 3G, 4G, 4.5G, and 5G and new radio (NR) in the future, etc., and/or other communication protocols that are currently known or will be developed in the future.

In the embodiments of this disclosure, the term “network device”, for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above. In this text, "a device" may refer to a network device, and may also refer to a terminal equipment, unless otherwise specified.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, the communication system 100 may include a network device 101 and terminal equipments 102, 103. For the sake of simplicity, an example having only two terminal equipments and one network device is schematically given in FIG. 1; however, the embodiment of this disclosure is not limited thereto.

In the embodiments of this disclosure, existing services or services that may be implemented in the future may be performed between the network device 101 and the terminal equipments 102, 103. For example, such services may include but not limited to an enhanced mobile broadband (eMBB), massive machine type communication (mMTC), and ultra-reliable and low-latency communication (URLLC), etc.

It should be noted that FIG. 1 shows that two terminal equipments 102, 103 are both within a coverage of the network device 101. However, this disclosure is not limited thereto, and the two terminal equipments 102, 103 may not be within the coverage of the network device 101, or one terminal equipment 102 is within the coverage of the network device 101 and the other terminal equipment 103 is outside the coverage of the network device 101.

In the embodiments of this disclosure, sidelink transmission may be performed between the two terminal equipments 102, 103. For example, the two terminal equipments 102, 103 may both perform sidelink transmission within the coverage of the network device 101 to implement V2X communications, or both of them may perform sidelink transmission outside the coverage of the network device 101 to implement V2X communications, and it may also be that one terminal equipment 102 is within the coverage of the network device 101 and another terminal equipment 103 is outside the coverage of the network device 101 and perform sidelink transmission to implement V2X communications.

In the embodiments of this disclosure, the terminal equipment 102 and/or the terminal equipment 103 may be allocated with sidelink resources by the network device (i.e. in mode 1). Of course, autonomous selection of sidelink resources (i.e. in mode 2) and allocation of sidelink resources by the network device (i.e. in mode 1) may be combined in the embodiments of this disclosure, which are not limited in the embodiments of this disclosure.

For an NR Uu link, when a terminal equipment performs uplink transmission simultaneously on multiple uplink carriers, the different uplink carriers may possibly be used to transmit different types of uplink physical channels or uplink physical signals, including at least one of a physical random access channel (PRACH), a physical uplink control channel (PUCCH), a physical uplink shared channel (PUSCH), or a sounding reference signal (SRS). One or more uplink physical channels and/or signals shall be referred to as first uplink physical channels/signals.

Based on the power allocation priority orders between uplink physical channels and/or signals defined in the standards, the terminal equipment will allocate power to the physical channels or physical signals in a descending order of priorities and ensure that total power does not exceed a maximum power limit of the terminal equipment. In other words, the terminal equipment will preferentially allocate power to physical channels or physical signals with higher priorities, or the terminal equipment will preferentially transmit the physical channels or physical signals with higher priorities.

For example, the terminal equipment transmits a PUCCH carrying Uu HARQ-ACK on carrier 1, and at the same time, it needs to transmit a PUSCH carrying Uu data on carrier 2. According to the priority orders defined in the standards, the terminal equipment will always allocate power preferentially to the PUCCH.

However, existing Uu power allocation priority rules may lead to unfair power allocation results in NR V2X. In NR V2X, PUCCH/PUSCH may be used to transmit sidelink HARQ-ACK. For example, for PUSCHs carrying sidelink HARQ-ACK and Uu data, their power allocation priorities should not only depend on a priority of the Uu, but should also take a priority of the sidelink into account. For another example, for a PUCCH carrying only sidelink HARQ-ACK, as the sidelink and the Uu have their own priority assessment systems, the priorities of the sidelink and the Uu cannot be directly compared, hence, sidelink HARQ-ACK and Uu HARQ-ACK are unable to be differentiate to blindly reuse the power allocation priority of the NR Uu. For the above case, reusing the existing NR Uu power allocation priority orders will lead to unfair power allocation results.

For example, on carrier 1, the terminal equipment transmits a PUSCH carrying sidelink HARQ-ACK and Uu data, and at the same time, it needs to transmit a PUCCH carrying Uu CSI on carrier 2, if the power allocation priority of the NR Uu is reused and only Uu data priority in the PUSCH is taken into account, the terminal equipment will always preferentially allocate power to the PUCCH. However, the priority of the sidelink HARQ-ACK may be higher than that of the Uu, and it is unfair for the sidelink that the Uu always has a precedence.

For another example, on carrier 1, the terminal equipment transmits a PUCCH carrying only sidelink HARQ-ACK and needs to transmit a PUSCH carrying Uu data on carrier 2 at the same time. If the power allocation priority of the NR Uu is reused and the sidelink HARQ-ACK and Uu HARQ-ACK are not differentiated, the terminal equipment will always preferentially allocate power to the PUCCH, that is, the sidelink HARQ-ACK always has a precedence. However, the importance (priority) of the sidelink HARQ-ACK may possibly be lower than that of the PUSCH (for example, the PUSCH carries URLLC data). That the sidelink HARQ-ACK always has a precedence will always cause the PUSCH performance to be lost, which is obviously unfair for the Uu link.

The embodiments of this disclosure provide corresponding solutions to the above problems.

In the embodiments of this disclosure, the sidelink is described by taking V2X as an example; however, this disclosure is not limited thereto, and it may also be applicable to sidelink transmission scenarios other than V2X. In the following description, without causing confusion, terms “sidelink” and “V2X” are interchangeable, terms “PSFCH” and “sidelink feedback channel” are interchangeable, terms “PSCCH” and “sidelink control channel” or “sidelink control information” are interchangeable, and terms “PSSCH” and “sidelink data channel” or “sidelink data” are interchangeable.

In addition, transmitting or receiving a PSSCH may be understood as transmitting or receiving sidelink data carried by the PSSCH, and transmitting or receiving a PSFCH may be understood as transmitting or receiving sidelink feedback information carried by the PSFCH. At least one time of transmission may be understood as at least one time of PSSCH/PSCCH transmission or at least one time of sidelink data/information transmission, and current transmission may be understood as current PSSCH/PSCCH transmission or current sidelink data/information transmission.

Embodiments of a First Aspect

The embodiments of this disclosure provide a power allocation method, which shall be described from a terminal equipment. The terminal equipment (which may also be referred to as a transmitting terminal equipment) may be taken as a transmitter of service data to transmit sidelink data to one or more other terminal equipments (which may also be referred to as receiving terminal equipments), and may receive feedback information from the other terminal equipments; and furthermore, the terminal equipment transmits data/information to the network device on a Uu link.

Figure 2:
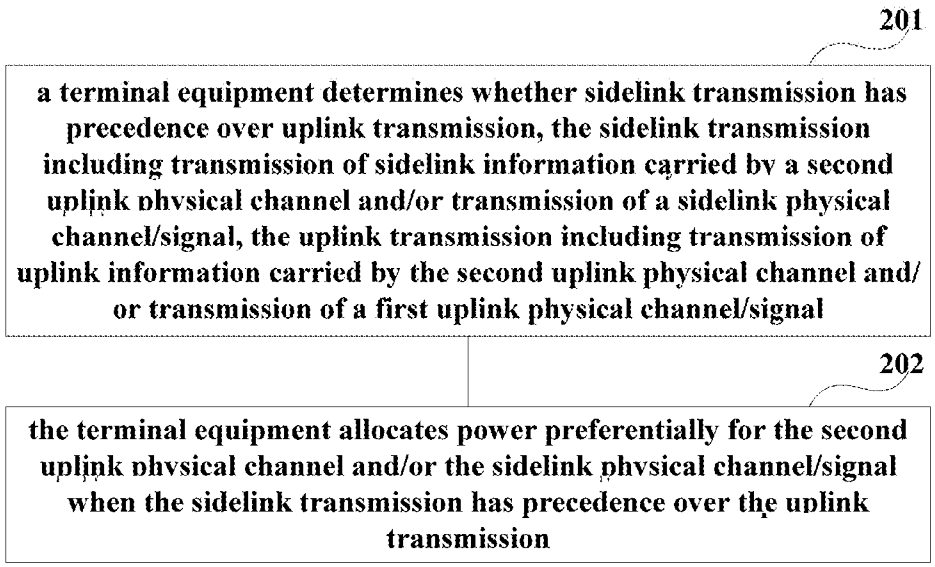
FIG. 2 is a schematic diagram of the power allocation method of an embodiment of this disclosure.

FIG. 2 is a schematic diagram of the power allocation method of the embodiment of this disclosure. As shown in FIG. 2, the method includes:

201: a terminal equipment determines whether sidelink transmission has precedence over uplink transmission, the sidelink transmission including transmission of sidelink information carried by a second uplink physical channel and/or transmission of a sidelink physical channel/signal, the uplink transmission including transmission of uplink information carried by the second uplink physical channel and/or transmission of a first uplink physical channel/signal; and

202: allocates power preferentially for the second uplink physical channel and/or the sidelink physical channel/signal when the sidelink transmission has precedence over the uplink transmission.

In the embodiments of this disclosure, the transmission of the first uplink physical channel/signal does not carry sidelink information, the second uplink physical channel at least carries sidelink information, and the second uplink physical channel, the first uplink physical channel/signal and the sidelink physical channel/signal overlap temporally.

It should be noted that FIG. 2 only schematically illustrates the embodiments of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 2.

In the embodiments of this disclosure, the first uplink physical channel/signal may include one or more uplink physical channels/signals, and the sidelink physical channel/signal (such as a PSSCH, a PSCCH, and a PSFCH, etc.) may include one or more sidelink physical channels/signals. In this text, “/” means “and/or”.

In some embodiments, power is allocated to the second uplink physical channel and/or the sidelink physical channel/signal according to a power allocation priority of the sidelink.

In some embodiments, when the second uplink physical channel does not carry uplink information and the sidelink transmission has no precedence over the uplink transmission, power is preferentially allocated to the first uplink physical channel/signal.

In some embodiments, power is allocated to the first uplink physical channel/signal according to an uplink power allocation priority.

In some embodiments, when the second uplink physical channel also carries uplink information and the sidelink transmission has no precedence over the uplink transmission, power is preferentially allocated to the second uplink physical channel and/or the first uplink physical channel/signal.

In some embodiments, power is allocated to the second uplink physical channel and/or the first uplink physical channel/signal according to the uplink power allocation priority.

Figure 3:
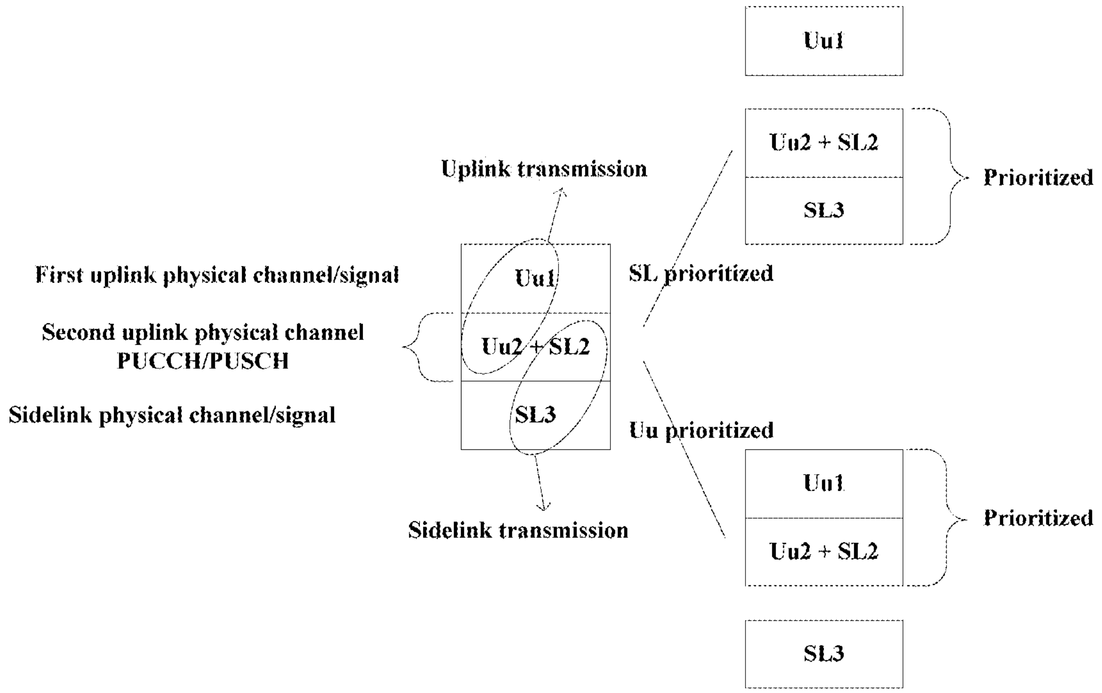
FIG. 3 is an exemplary diagram of performing power allocation of the embodiment of this disclosure.

FIG. 3 is an exemplary diagram of performing power allocation of the embodiment of this disclosure. As shown in FIG. 3, the terminal equipment needs to perform uplink transmission and sidelink transmission simultaneously. The terminal equipment transmits Uu information and SL (sidelink) information to a base station via the second uplink physical channel (PUCCH or PUSCH), and the Uu2 information and SL2 information are multiplexed in the same PUCCH or PUSCH.

The second uplink physical channel may carry sidelink information only, or may carry sidelink information and Uu information simultaneously. The embodiments of this disclosure shall be described by taking that the second uplink physical channel contains one PUCCH or PUSCH as an example, which may be easily extended to cases where the second uplink physical channel contains multiple PUCCHs or PUSCHs.

As shown in FIG. 3, in the time transmitting the second uplink physical channel, the terminal equipment needs to perform uplink transmission, that is, transmitting the first uplink physical channel/signal (Uu1), and at the same time, perform sidelink transmission, that is, transmitting the sidelink physical channel/signal (SL3). The first uplink physical channel/signal (Uu1) may be one or more uplink physical channels/signals, and does not carry any sidelink information.

Without loss of generality, an uplink physical channel/signal is/are taken as an example in FIG. 3. The sidelink physical channel/signal (SL3) may be one or more sidelink physical channels/signals and do(es) not carry any Uu information. Without loss of generality, one sidelink physical channel/signal is/are taken as an example in FIG. 3, and this disclosure is not limited thereto.

Transmission of the terminal equipment is divided into two parts according to Uu and SL: uplink transmission and sidelink transmission. As the second uplink physical channel PUCCH/PUSCH contain(s) both Uu and SL, Uu information (Uu2) therein belongs to uplink transmission, and SL information (SL2) therein belongs to sidelink transmission.

For example, when the sidelink transmission has precedence over the uplink transmission, the second uplink physical channel PUCCH/PUSCH and sidelink physical channel/signal are divided to the SL side, and the SL side (Uu2, SL2 and SL3) has a higher priority than that of the Uu side (Uu1, the first uplink physical channel/signal), hence, it will be preferentially allocated power.

For example, when the uplink transmission has precedence over the sidelink transmission (or in other words, the sidelink transmission has no precedence over the uplink transmission), the second uplink physical channel PUCCH/PUSCH and the first uplink physical channel/signal are divided to the Uu side, and the Uu side (Uu2, SL2 and Uu1) has a higher priority than that of the SL side (SL3, sidelink physical channel/signal), hence, it will be preferentially allocated power.

In determining whether the sidelink transmission has precedence over the uplink transmission, any method may be used, which is not limited herein. For example, at least one of a priority of a sidelink logical channel, an uplink logical channel priority or a priority of a sidelink SCI indication is used.

In allocating power to the SL side, any SL power allocation method may be used, such as according to the power allocation priority of the SL, which is not limited herein; and when there exists a second uplink physical channel, a Uu part in the second uplink physical channel is ignored. In allocating power to the Uu side, any Uu power allocation method may be used, such as according to the power allocation priority of the Uu, which is not limited herein; and when there exists a second uplink physical channel, the SL part in the second uplink physical channel is ignored.

In some embodiments, the second uplink physical channel, the first uplink physical channel/signal and the sidelink physical channel/signal may be located on different carriers, or may be located on the same carrier, or some of them may be located on different carriers, and the other part thereof may be located on the same carrier, which is not limited herein.

Some examples of variants of the embodiment of this disclosure shall be schematically given below.

Figure 4:
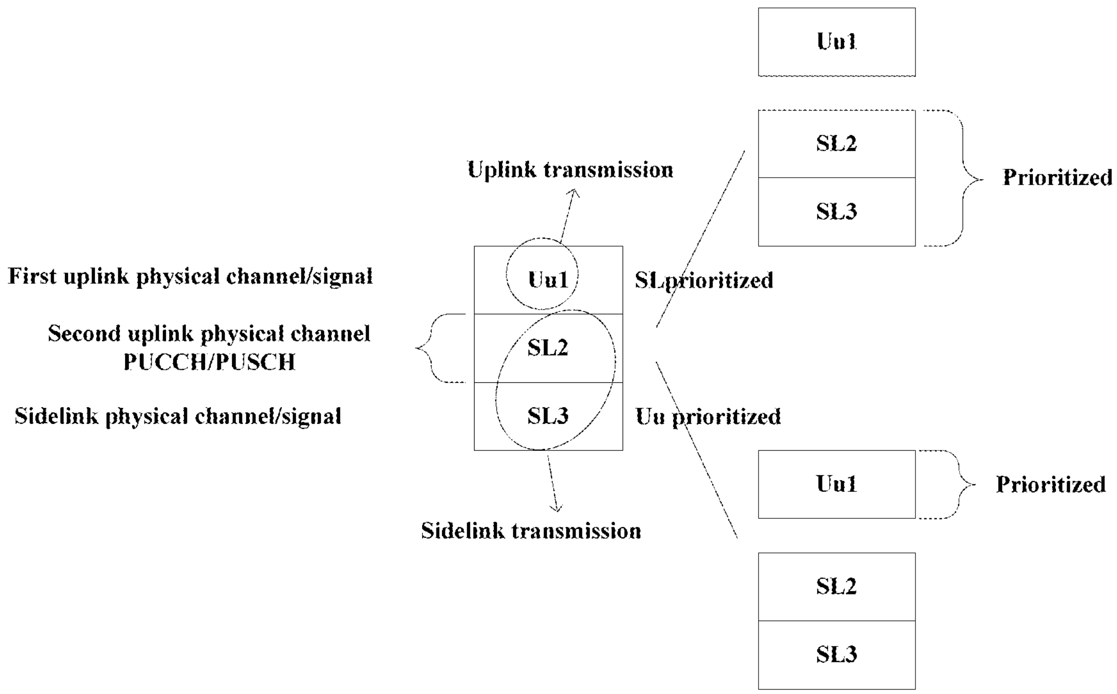
FIG. 4 is another exemplary diagram of performing power allocation of the embodiment of this disclosure.

FIG. 4 is another exemplary diagram of performing power allocation of the embodiment of this disclosure. As shown in FIG. 4, the second uplink physical channel only carries sidelink information (SL2). When the sidelink transmission has precedence over the uplink transmission, the second uplink physical channel and the sidelink physical channel/signal are divided to the SL side, and the SL side (SL2 and SL3) has a higher priority than the Uu side (Uu1, the first uplink physical channel/signal), hence, it will be preferentially allocated power.

When the sidelink transmission has no precedence over the uplink transmission, the second uplink physical channel and the sidelink physical channel/signal are divided to the SL side, and the Uu side (Uu1, the first uplink physical channel/signal) has a higher priority than the SL side (SL2 and SL3), hence, it will be preferentially allocated power.

Figure 5:
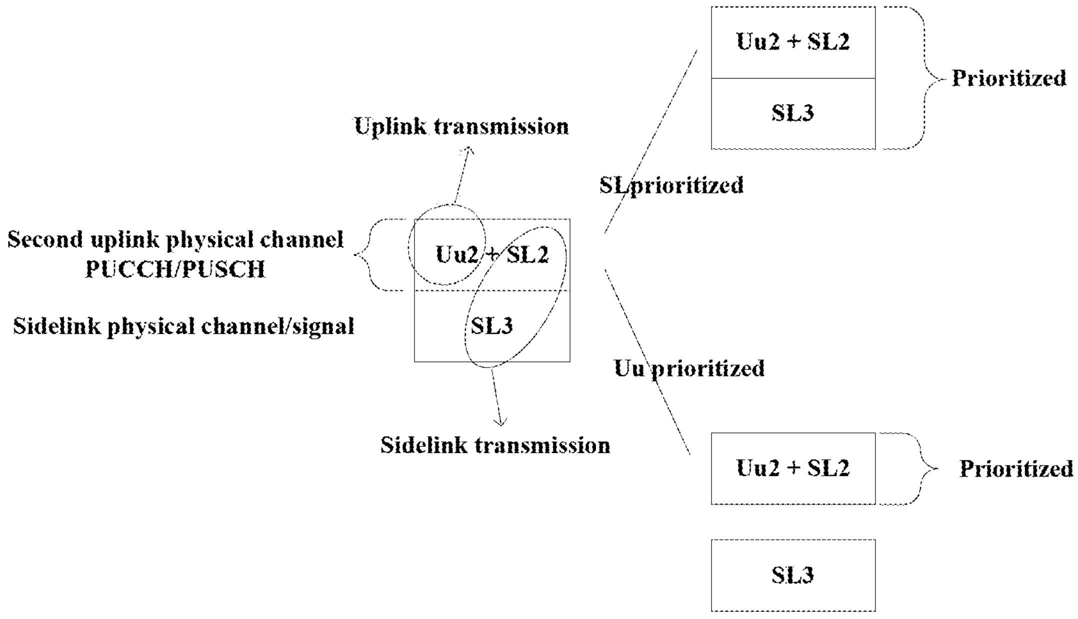
FIG. 5 is a further exemplary diagram of performing power allocation of the embodiment of this disclosure.
Figure 6:
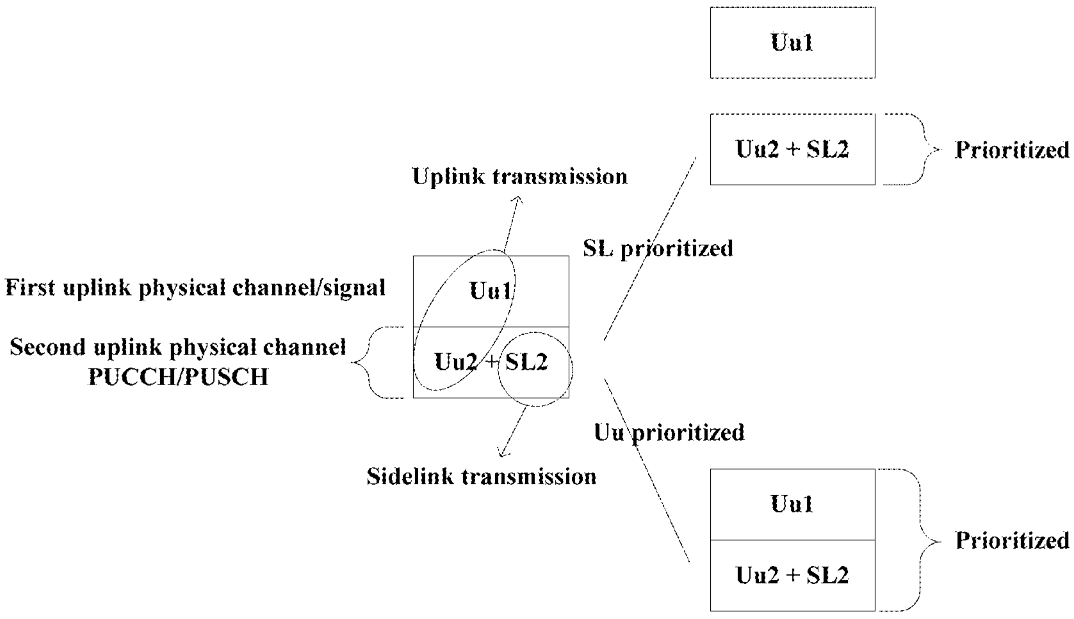
FIG. 6 is still another exemplary diagram of performing power allocation of the embodiment of this disclosure.

FIG. 5 is a further exemplary diagram of performing power allocation of the embodiment of this disclosure, in which a case where there exists no first uplink physical channel/signal is shown. FIG. 6 is still another exemplary diagram of performing power allocation of the embodiment of this disclosure, in which a case where there exists no sidelink physical channel/signal is shown.

Some embodiments of this disclosure have been schematically described above, which shall be further described below.

In some embodiments, the terminal equipment transmits sidelink information to the network device on one uplink carrier via a second uplink physical channel, the sidelink information may be HARQ-ACK and/or CSI, and the second uplink physical channel may be a PUCCH or PUSCH. The terminal equipment transmits the first uplink physical channel and/or signal to the network device on one or more other uplink carriers, the first uplink physical channel and/or signal may include a PRACH, a PUCCH, a PUSCH or an SRS.

In some embodiments, the second uplink physical channel is one of the following channels: a physical uplink control channel carrying sidelink information (SL-PUCCH), a physical uplink shared channel carrying sidelink information (SL-PUSCH), a physical uplink control channel carrying sidelink information and uplink information (Uu information) (SL-UL-PUCCH), a physical uplink shared channel carrying sidelink information and uplink information (Uu information) (SL-UL-PUSCH).

That is, in order to distinguish the PUCCH/PUSCH carrying the sidelink information and the PUCCH/PUSCH carrying the Uu information, the PUCCH/PUSCH carrying the sidelink information is/are subdivided into the following:

- SL-PUCCH: a PUCCH carrying the sidelink information only;
- SL-PUSCH: a PUSCH carrying the sidelink information only;
- SL-UL-PUCCH: a PUCCH carrying both the sidelink information and the Uu information; the terminal equipment multiplexes the sidelink information and the Uu information in the same PUCCH for transmission, the Uu information including at least one of Uu HARQ-ACK, Uu CSI or a Uu SR;
- SL-UL-PUSCH: a PUSCH carrying both the sidelink information and the Uu information; the terminal equipment multiplexes the sidelink information and the Uu information in the same PUSCH for transmission, the Uu information including at least one of Uu HARQ-ACK, Uu CSI or Uu data.

Figure 7:
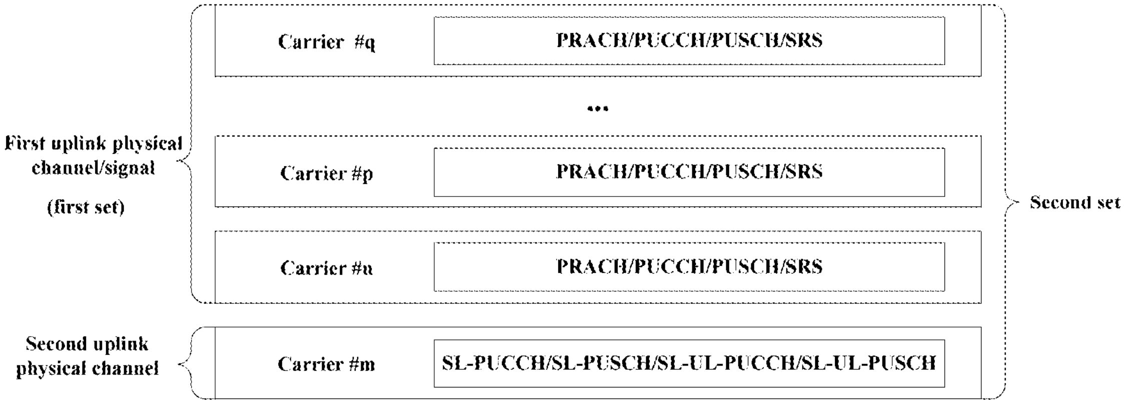
FIG. 7 is an exemplary diagram of the physical channel and/or signal of the embodiment of this disclosure.

FIG. 7 is an exemplary diagram of the physical channel and/or signal of the embodiment of this disclosure. As shown in FIG. 7, the PUCCH/PUSCH carrying the sidelink information on one carrier may be referred to as the second uplink physical channel, and the second uplink physical channel is one of an SL-PUCCH, an SL-PUSCH, ab SL-UL-PUCCH or an SL-UL-PUSCH. And a physical channel and/or signal on other one or more carriers are referred to as the first uplink physical channel/signal.

As shown in FIG. 7, for the sake of convenience, the first uplink physical channel/signal is/are referred to as a first set (carrying Uu information but not carrying sidelink information), and the first set includes at least one of a PRACH, a PUCCH, a PUSCH or an SRS. When the second uplink physical channel is an SL-UL-PUCCH or SL-UL-PUSCH, a union of the first set and the second uplink physical channel is referred to as a second set (carrying Uu information and sidelink information).

Although the uplink physical signal carries no Uu information in a strict sense, as the uplink physical signal is used for Uu communication rather than sidelink communication, it is also collectively referred to as "carrying Uu information", that is, the meaning of "carrying Uu information" includes that the uplink physical channel carries information for Uu communications and/or that the uplink physical signal is used for Uu communications.

Figure 8:
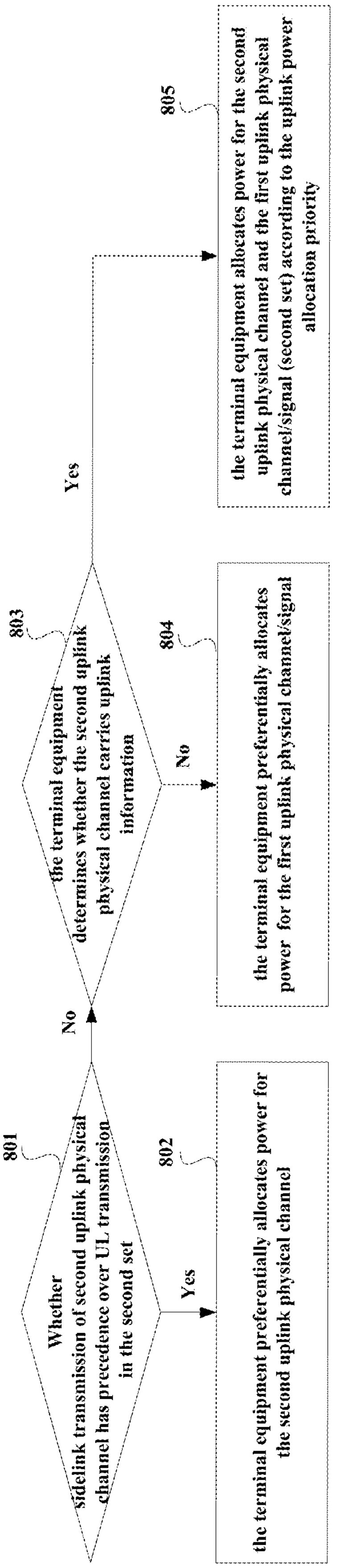
FIG. 8 is another schematic diagram of the power allocation method of an embodiment of this disclosure.

FIG. 8 is another schematic diagram of the power allocation method of the embodiment of this disclosure. As shown in FIG. 8, the method includes:

801: the terminal equipment determines whether sidelink transmission of the second uplink physical channel has precedence over uplink transmission in the second set, the second uplink physical channel at least carries sidelink information, and the first uplink physical channel/signal carries uplink information.

As shown in FIG. 8, when the sidelink transmission of the second uplink physical channel has precedence over the uplink transmission in the second set (that is, a result of 801 shown in FIG. 8 is yes), the method includes:

802: the terminal equipment preferentially allocates power for the second uplink physical channel.

In the embodiments of this disclosure, "preferentially allocating power for the second uplink physical channel", "the second uplink physical channel has a higher power allocation priority" and "adjusting power of one or more first uplink physical channels and/or signals in the first set so that total power does not exceed a maximum power limit" have the same meaning. And "preferentially allocating power for the second uplink physical channel" also includes transmitting the second uplink physical channel only and not transmitting (discarding) one or more first uplink physical channels/signals in the first set. Likewise, "preferentially allocating power for the first set" may also be interpreted in a similar way.

As shown in FIG. 8, when the sidelink transmission of the second uplink physical channel has no precedence over the uplink transmission in the second set (that is, the result of 801 shown in FIG. 8 is no), the method further includes:

803: the terminal equipment determines whether the second uplink physical channel carries uplink information.

As shown in FIG. 8, when the second uplink physical channel does not carry uplink information (that is, a result of 803 shown in FIG. 8 is no), the method further includes:

804: the terminal equipment preferentially allocates power for the first uplink physical channel/signal.

For example, when the second physical channel is an SL-PUCCH or SL-PUSCH, power is preferentially allocated for the first uplink physical channel/signal (first set).

In some embodiments, power may be allocated for multiple uplink physical channels and/or signals according to the uplink power allocation priority.

As shown in FIG. 8, when the second uplink physical channel carries uplink information (that is, the result of 803 shown in FIG. 8 is yes), the method further includes:

805: the terminal equipment allocates power for the second uplink physical channel and the first uplink physical channel/signal (second set) according to the uplink power allocation priority.

For example, when the second uplink physical channel is an SL-UL-PUCCH or SL-UL-PUSCH, power is allocated for the second set in a descending order of Uu power allocation priorities. More specifically, a power allocation order is determined only according to the Uu power allocation priority within the second set.

It should be noted that FIG. 8 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 8.

In some embodiments, both "allocating power for the first set" and "allocating power for the second set" involve allocating power for physical channels and/or physical signals within a set. As there may exist multiple Uu physical channels and/or physical signals within the set, determination of a power allocation priority within the set may use any techniques related to the NR Uu.

For example, the power allocation may be performed according to subsection 7.5 of Rel-15 NR standard TS 38.213V15.7.0. In short, the power allocation priorities of Release-15 NR Uu are arranged as follows in a descending order of power allocation priorities, and reference may be made to documents of the relevant standards.

a PRACH transmitted on a PCell a PUCCH carrying HARQ-ACK and/or an SR, or a PUSCH carrying HARQ-ACK a PUCCH carrying CSI, or a PUSCH carrying CSI a PUSCH carrying no HARQ-ACK or CSI (that is, the PUSCH carries data information only)

an SRS, or a PRACH transmitted on a non-PCell.

For another example, the power allocation may be performed according to the power allocation priorities defined in the future Rel-16 NR standard.

It should be noted that the second set contains an SL-UL-PUCCH or SL-UL-PUSCH carrying both sidelink information and Uu information, and in allocating power for the second set, the SL-UL-PUCCH or SL-UL-PUCCH is deemed as a PUCCH or PUSCH carrying corresponding Uu information only, that is, the sidelink information is ignored, so that any techniques related to the Uu power allocation may be used for power allocation.

Figure 9:
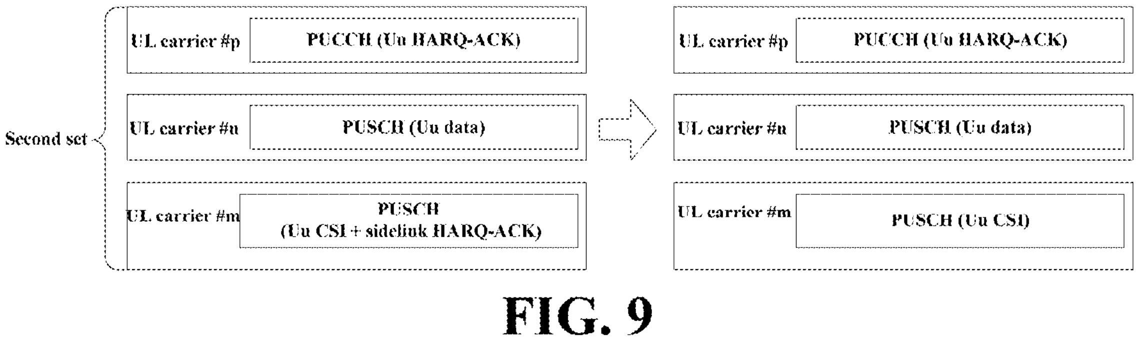
FIG. 9 is an exemplary diagram of performing power allocation of the embodiment of this disclosure.

FIG. 9 is an exemplary diagram of performing power allocation of the embodiment of this disclosure. As shown in FIG. 9, for carrier #m, in performing priority comparison, the sidelink information in the PUSCH carrying Uu CSI and sidelink HARQ-ACK is ignored, and it is deemed that power allocation is performed for the PUSCH carrying Uu CSI.

Figure 10:
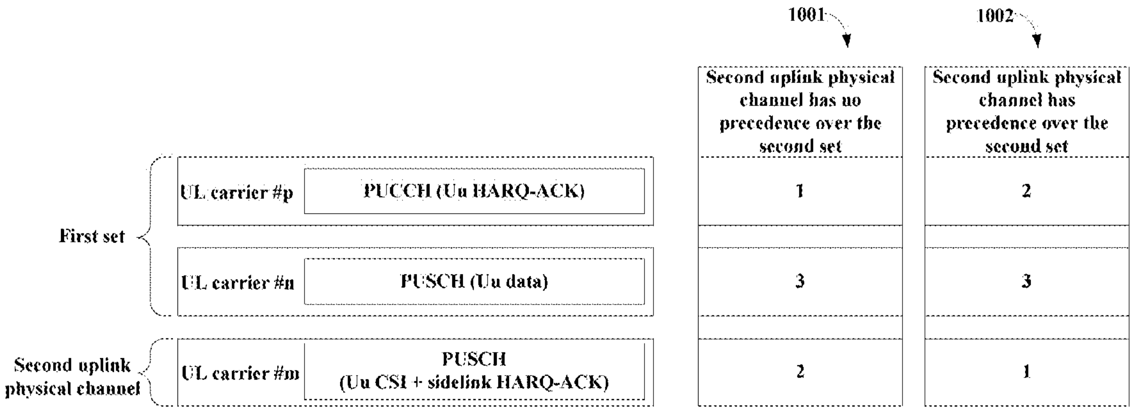
FIG. 10 is an exemplary diagram of a power priority of the embodiment of this disclosure.

FIG. 10 is an exemplary diagram of a power priority of the embodiment of this disclosure, showing a priority order of the physical channels in FIG. 9, and the priorities correspond to serial numbers 1, 2, and 3 in FIG. 10 respectively in a descending order.

As shown by 1002 in FIG. 10, when the sidelink transmission of the second uplink physical channel has precedence over the uplink transmission in the second set, the priorities in a descending order are the PUSCH carrying the Uu CSI and the sidelink HARQ-ACK (at this moment, the priority is 1), the PUCCH carrying the Uu HARQ-ACK (at this moment, the priority is 2), and the PUSCH carrying the Uu data (at this moment, the priority is 3) in turn.

As shown by 1001 in FIG. 10, when the sidelink transmission of the second physical channel has no precedence over the uplink transmission in the second set, the priorities in a descending order are the PUCCH carrying the Uu HARQ-ACK (at this moment, the priority is 1), the PUSCH carrying the Uu CSI and the sidelink HARQ-ACK (at this moment, the priority is 2), and the PUSCH carrying the Uu data (at this moment, the priority is 3) in turn.

In some embodiments, the parameters for determining whether the sidelink transmission of the second uplink physical channel has precedence over the uplink transmission in the second set at least includes the priority of the sidelink transmission of the second uplink physical channel and/or the priority of the uplink transmission in the second set.

In some embodiments, when a highest priority of the sidelink transmission is higher than a first priority, the terminal equipment determines that the sidelink transmission has precedence over the uplink transmission; otherwise, it determines that the sidelink transmission has no precedence over the uplink transmission.

In some embodiments, when the highest priority of the sidelink transmission is higher than the first priority and a highest priority of the uplink transmission is lower than a second priority, the terminal equipment determines that the sidelink transmission has precedence over the uplink transmission; otherwise, it determines that the sidelink transmission has no precedence over the uplink transmission.

In the embodiments of this disclosure, "a priority is higher than a certain threshold" is equivalent to "a value of a priority is less than a certain value threshold", in other words, the smaller the value of the priority, the higher the priority. Likewise, "a priority is lower than or equal to a certain threshold" is equivalent to "a value of a priority is greater than or equal to a certain value threshold".

In addition, for a condition of a determination branch, a case of "equal to" may be attributed to a "greater than" side, or may be attributed to a "less than" side. For example, it may be divided into two branches, "greater than or equal to" and "less than", and may also be divided into other two branches, "greater than" and "less than or equal to", which shall not be enumerated herein.

How to determine whether the second uplink physical channel has precedence over the first uplink physical channel and/or signal has been schematically described above; however, methods used in this disclosure are not limited thereto. The priorities shall be schematically described below.

In some embodiments, the sidelink information includes one or more bits of sidelink hybrid automatic repeat request (HARQ) feedback, and the priority of the sidelink transmission is a highest priority in priorities of the one or more bits.

In some embodiments, the priority of the bit is equal to the priority of the PSSCH if the bit has an associated physical sidelink shared channel (PSSCH); and if the bit has no associated physical sidelink shared channel (PSSCH), the bit has a lowest priority.

For example, when the sidelink information contains a single sidelink HARQ-ACK bit, the priority of the sidelink information is the priority of the PSSCH associated with the sidelink HARQ-ACK. More specifically, the sidelink HARQ-ACK is ACK/NACK feedback for the PSSCH. The PSSCH is scheduled by the PSCCH (SCI), and the priority of PSSCH is indicated by a field "priority" in the SCI. Actually, this priority is also equivalent to a highest priority of a logical channel carried by the PSSCH.

For another example, when the sidelink information includes multiple sidelink HARQ-ACK bits, the priority of the sidelink information is a highest priority in the multiple sidelink HARQ-ACK bits. This situation may occur, for example, multiple sidelink HARQ-ACK bits for multiple PSSCHs may be multiplexed on the same second uplink physical channel and transmitted, hence, the sidelink information carried by the second uplink physical channel may contain multiple sidelink HARQ-ACK bits.

For a further example, when a sidelink HARQ-ACK bit contained in the sidelink information has no PSSCH associated with it, this sidelink HARQ-ACK bit is deemed as having a lowest priority. This situation may happen, for example, the second uplink physical channel carries a semi-static HARQ-ACK codebook (also referred to as a type 1 HARQ-ACK codebook), as a size of the semi-static HARQ-ACK codebook must be fixed, when there exists no PSSCH, a corresponding position in the codebook will be filled NACK for occupation, and this NACK will be deemed as having a lowest priority.

For still another example, for configured grant or grant-free transmission, the terminal equipment will not transmit a PSSCH when no service arrives. At this moment, the terminal equipment may report ACK to the base station via the second uplink physical channel, indicating that the base station does not need to allocate time-frequency resources for transmission or retransmission for the terminal equipment, and this ACK will be deemed as having a lowest priority.

In some embodiments, the sidelink information includes sidelink channel state information (CSI), and the priority of the sidelink transmission is a priority of the sidelink channel state information.

For example, when the sidelink information includes sidelink CSI, such as including at least one of a CQI, an RI or a PMI, the priority of the sidelink information is a priority of the sidelink CSI.

In some embodiments, the sidelink information includes one or more bits of the sidelink channel state information (CSI) and the sidelink hybrid automatic repeat request (HARQ) feedback, and the priority of the sidelink transmission is a highest priority in priorities of the sidelink channel state information and the one or more bits.

For example, when the sidelink information contains both the sidelink HARQ-ACK and the sidelink CSI, the priority of the sidelink information is a highest priority in priorities of the sidelink HARQ-ACK and the sidelink CSI.

In some embodiments, the priority of the uplink transmission in the second set is a highest priority in priorities of all Uu physical channels and/or physical signals contained in the second set. For example, this priority is a highest priority in priorities of logical channels carried by all uplink physical channels and/or signals in the second set.

In some embodiments, the priority of the sidelink transmission of the second uplink physical channel is the priority of the sidelink, and the priority of the first uplink physical channel/signal is the priority of the Uu.

In some embodiments, the allocating power includes: allocating power for multiple physical channels or signals according to an order of priorities, or allocating power for one or more physical channels or signals with a highest priority.

For example, when it is needed to simultaneously transmit the second uplink physical channel (SL-PUCCH/SL-PUSCH/SL-UL-PUCCH/SL-UL-PUSCH) and the first uplink physical channel and/or signal (PRACH/PUCCH/PUSCH/SRS) on an uplink carrier, the terminal equipment may determine a power allocation priority according to the method in the above embodiment, and perform power allocation in a descending order of priorities.

For another example, when the terminal equipment is able to transmit one physical channel only, it may transmit a physical channel with a highest priority in the second uplink physical channel and the uplink physical channels/signals contained in the first set.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that the terminal equipment preferentially allocates power to the second uplink physical channel at least carrying the sidelink information when the sidelink transmission has precedence over the uplink transmission. Therefore, when the terminal equipment feeds back information to the network device, fairness of power allocation may be ensured, so that power may be preferentially allocated to the physical channel or physical signal with the most urgent demand or the highest degree of importance.

Embodiments of a Second Aspect

The embodiments of this disclosure shall be described on the basis of the embodiment of the first aspect. The embodiments of this disclosure may be executed separately, or may be executed in combination with the embodiments of the first aspect, with contents identical to those in the embodiments of the first aspect being not going to be described herein any further.

Figure 11:
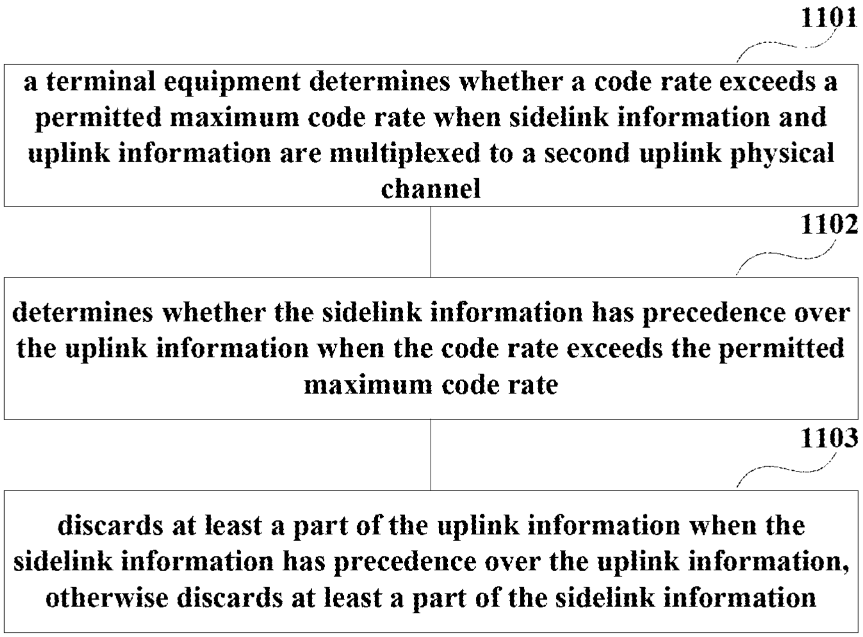
FIG. 11 is a schematic diagram of the data multiplexing method of an embodiment of this disclosure.

FIG. 11 is a schematic diagram of the data multiplexing method of the embodiment of this disclosure. As shown in FIG. 11, the method includes:

- 1101: a terminal equipment determines whether a code rate exceeds a permitted maximum code rate when sidelink information and uplink information are multiplexed to a second uplink physical channel;
- 1102: determines whether the sidelink information has precedence over the uplink information when the code rate exceeds the permitted maximum code rate; and
- 1103: discards at least a part of the uplink information when the sidelink information has precedence over the uplink information, and discards at least a part of the sidelink information when the sidelink information has no precedence over the uplink information.

It should be noted that FIG. 11 only schematically illustrates the embodiments of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 11.

For a Uu link, when the terminal equipment needs to report multiple types of UCI (HARQ-ACK, SR, CSI) at the same time, and when a code rate of the UCI exceeds a maximum permitted code rate, the terminal equipment will discard some UCIs according to a priority rule, or in other words, select a part of UCIs in all the UCIs in a descending order of priorities for transmission. For example, reference may be made to sub-section 9.2.5 of TS 38.213V15.7.0 in Rel-15 NR standard for a method for discarding the UCI by the Uu. In addition, reference may be made to related techniques for such contents as data multiplexing, code rate, and maximum allowable code rate, etc., which shall not be described herein any further.

In some embodiments, when a PUCCH or PUSCH needs to carry both Uu information and sidelink information, that is, generate an SL-UL-PUCCH or an SL-UL-PUSCH, when the code rate calculated according to all the information bits exceeds the permitted maximum code rate, some information needs to be discarded, so as to ensure that the code rate is within a range of the permitted maximum code rate.

In some embodiments, when the sidelink information has precedence over the Uu information, the Uu information is discarded firstly. Uu-related techniques may be used for discarding the Uu information, such as the method in sub-section 9.2.5 of TS 38.213 V15.7.0. And all or a part of the Uu information may be discarded.

For example, when the Uu information contains both Uu HARQ-ACK and the Uu CSI, the Uu CSI information may be discarded firstly; and when the Uu information contains multiple pieces of Uu CSI information, Uu CSI information with a lower priority is discarded firstly.

In some embodiments, when the sidelink information has no precedence over the Uu information, the sidelink information is discarded firstly. And all or a part of the sidelink information may be discarded.

For example, when the sidelink information contains both sidelink HARQ-ACK and sidelink CSI, the sidelink CSI information may be discarded firstly; and when the sidelink information contains multiple pieces of sidelink CSI information, sidelink CSI information with a lower priority is discarded firstly.

In some embodiments, the parameter for determining whether the sidelink information has precedence over the Uu information includes at least one of the priority of the sidelink information or the priority of the Uu information. In the embodiments of this disclosure, depending on different contexts, the priority of the sidelink transmission is sometimes referred to as a priority of sidelink information, and the priority of the uplink transmission is sometimes referred to as a priority of Uu information.

As one implementation, when the priority of the sidelink information is greater than the first priority threshold, it is deemed that the sidelink information has precedence over the Uu information; otherwise, it is deemed that the sidelink information has no precedence over the Uu information.

As one implementation, when the priority of the sidelink information is greater than the first priority threshold and the priority of the Uu information is less than or equal to the second priority threshold, it is deemed that the sidelink information has precedence over the Uu information; otherwise, it is deemed that the sidelink information has no precedence over the Uu information.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that in the case where the code rate exceeds the permitted maximum code rate, the terminal equipment determines whether the sidelink information has precedence over the uplink information, and when the sidelink information has precedence over the uplink information, the terminal equipment discards at least a part of the uplink information, and when the sidelink information has no precedence over the uplink information, the terminal equipment discards at least a part of the sidelink information. Hence, when the terminal equipment feeds information back to the network device, fairness of data multiplexing may be ensured, so that data with the most urgent demand or the highest degree of importance are multiplexed.

Embodiments of a Third Aspect

The embodiments of this disclosure are described on the basis of the embodiments of the first and second aspects. The embodiments may be executed separately, or may be executed in combination with the embodiments of the first and second aspects, with contents identical to those in the embodiments of the first and second aspects being not going to be described herein any further.

In the embodiments of this disclosure, according to a priority of sidelink transmission of a second uplink physical channel and priorities of one or more physical sidelink feedback channels (PSFCHs), a terminal equipment allocates power in a descending order of priorities.

Figure 12:
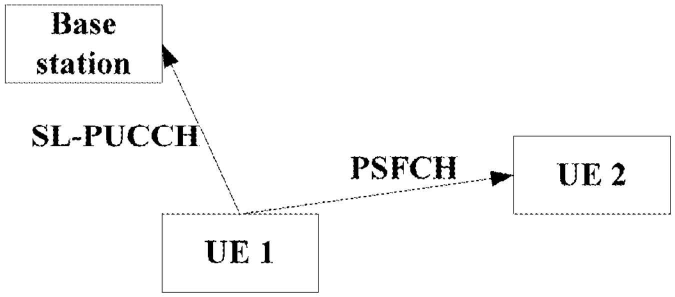
FIG. 12 is an exemplary diagram of transmitting a signal of the embodiment of this disclosure.

FIG. 12 is an exemplary diagram of transmitting a signal of the embodiment of this disclosure. As shown in FIG. 12, the terminal equipment (such as UE 1 shown in FIG. 11) may possibly transmit a second uplink physical channel (SL-PUCCH/SL-PUSCH/SL-UL-PUCCH/SL-UL-PUSCH) on an uplink carrier, and at the same time, it needs to transmit a PSFCH on a sidelink carrier. The sidelink carrier may be located at an ITS frequency band, or may be a certain uplink carrier of Uu, that is, it shares a carrier with the Uu, which is not limited in this disclosure.

As shown in FIG. 12, for example, a base station schedules UE 1 to transmit a PUCCH carrying sidelink HARQ-ACK to the base station at a slot n, and at the same time, UE 1 needs to transmit a PSFCH to UE 2 in the slot n. For example, UE 2 operates in mode 2, and autonomously determines a transmission time of a PSSCH, which is also equivalent to autonomously determining a transmission time of the PSFCH associated with the PSSCH, and a transmission time of the SL-PUCCH is determined by the base station. As it is possible that the base station is unable to be coordinated with UE2, it is unable to be avoided that the situation shown in FIG. 12 occurs in UE 1.

More broadly, UE 1 may need to transmit the second uplink physical channel and the PSFCH at the same time. When the UE 1 needs to transmit the second physical channel and the PSFCH at the same time, according to a priority of the sidelink transmission of the second uplink physical channel and a priority of the PSFCH, power is allocated in a descending order of priorities.

In some embodiments, the power allocation may also include: transmitting one of the second physical channel and the PSFCH which has a highest priority when the terminal equipment is able to transmit one physical channel only. This may be easily extended to a case where the terminal equipment transmits the second uplink physical channel and multiple PSFCHs, and the terminal equipment allocates power in a descending order of priorities. The priority of the sidelink transmission of the second uplink physical channel may be determined according to the method of the embodiments of the first aspect. Use of the priority of the PSFCH may use a definition in related techniques, i.e, the priority of the PSSCH with which the PSFCH is associated.

It can be seen from the above embodiments that according to the priority of the sidelink transmission of the second uplink physical channel and the priorities of the one or more physical sidelink feedback channels (PSFCHs), the terminal equipment allocates power in a descending order of priorities, which may ensure fairness of the power allocation, so that power is preferentially allocated to the physical channel or physical signal with the most urgent demand or the highest degree of importance.

Embodiments of a Fourth Aspect

The embodiments of this disclosure provide a power allocation apparatus. The apparatus may be, for example, a terminal equipment (such as the terminal equipment described above), or may be one or more components or assemblies configured in a terminal equipment. Contents in this embodiment identical to those in the embodiments of the first to the third aspects shall not be described herein any further.

Figure 13:
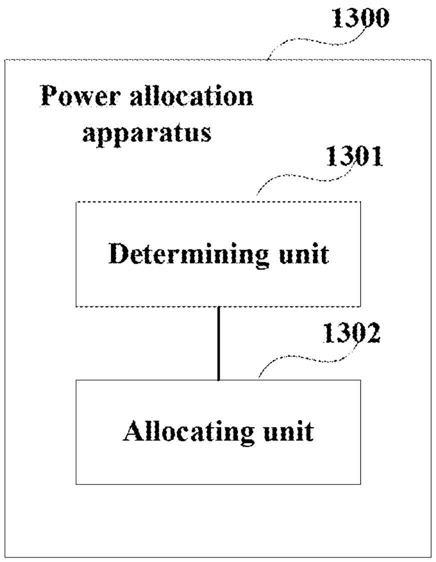
FIG. 13 is a schematic diagram of the power allocation apparatus of an embodiment of this disclosure.

FIG. 13 is a schematic diagram of the power allocation apparatus of the embodiment of this disclosure. As shown in FIG. 13, the power allocation apparatus 1300 includes:

a determining unit 1301 configured to determine whether sidelink transmission has precedence over uplink transmission, the sidelink transmission including transmission of sidelink information carried by a second uplink physical channel and/or transmission of a sidelink physical channel/signal, the uplink transmission including transmission of uplink information carried by the second uplink physical channel and/or transmission of a first uplink physical channel/signal; and an allocating unit 1302 configured to allocate power preferentially for the second uplink physical channel and/or the sidelink physical channel/signal when the sidelink transmission has precedence over the uplink transmission.

In the embodiments of this disclosure, the transmission of the first uplink physical channel/signal does not carry sidelink information, the second uplink physical channel at least carries sidelink information, and the second uplink physical channel, the first uplink physical channel/signal and the sidelink physical channel/signal overlap temporally.

In some embodiments, the allocating unit 1302 is further configured to allocate power for the second uplink physical channel and/or the sidelink physical channel/signal according to a sidelink power allocation priority.

In some embodiments, the allocating unit 1302 is further configured to allocate power preferentially for the first uplink physical channel/signal when the second uplink physical channel does not carry uplink information and the sidelink transmission has no precedence over the uplink transmission.

In some embodiments, the allocating unit 1302 is further configured to allocate power for the first uplink physical channel/signal according to a sidelink power allocation priority.

In some embodiments, the allocating unit 1302 is further configured to allocate power preferentially for the second uplink physical channel and/or the first uplink physical channel/signal when the second uplink physical channel carries uplink information and the sidelink transmission has no precedence over the uplink transmission.

In some embodiments, the allocating unit 1302 is further configured to allocate power for the second uplink physical channel and/or the first uplink physical channel/signal according to an uplink power allocation priority.

In some embodiments, a parameter used for determining whether the sidelink transmission has precedence over the uplink transmission at least includes a priority of the sidelink transmission and/or a priority of the uplink transmission.

In some embodiments, the determining unit 1301 is configured to determine that the sidelink transmission has precedence over the uplink transmission when a highest priority of the sidelink transmission is higher than a first priority; otherwise, determine that the sidelink transmission has no precedence over the uplink transmission.

In some embodiments, the determining unit 1301 is configured to determine that the sidelink transmission has precedence over the uplink transmission when a highest priority of the sidelink transmission is higher than a first priority and a highest priority of the uplink transmission is lower than or equal to a second priority; otherwise, determine that the sidelink transmission has no precedence over the uplink transmission.

In some embodiments, the sidelink information carried by the second uplink physical channel includes one or more bits of sidelink hybrid automatic repeat request feedback, and a priority of sidelink transmission of the second uplink physical channel is a highest priority in priorities of the one or more bits.

In some embodiments, when the bit has an associated physical sidelink shared channel, the priority of the bit is equal to a priority of the physical sidelink shared channel, and when the bit does not have an associated physical sidelink shared channel, the bit has a lowest priority.

In some embodiments, the sidelink information carried by the second uplink physical channel includes sidelink channel state information, and a priority of sidelink transmission of the second uplink physical channel is a priority of the sidelink channel state information.

In some embodiments, the sidelink information carried by the second uplink physical channel includes sidelink channel state information and one or more bits of sidelink hybrid automatic repeat request feedback, and a priority of sidelink transmission of the second uplink physical channel is a highest priority in priorities of the sidelink channel state information and the one or more bits.

In some embodiments, the second uplink physical channel is one of the following channels: a physical uplink control channel carrying sidelink information, a physical uplink shared channel carrying sidelink information, a physical uplink control channel carrying sidelink information and uplink information, or a physical uplink shared channel carrying sidelink information and uplink information.

In some embodiments, the determining unit 1301 is further configured to: determine whether a code rate exceeds a permitted maximum code rate when sidelink information and uplink information are multiplexed to the second uplink physical channel, determine whether the sidelink information has precedence over the uplink information when the code rate exceeds the permitted maximum code rate, and discard at least a part of the uplink information when the sidelink information has precedence over the uplink information.

In some embodiments, the determining unit 1301 is further configured to: discard at least a part of the sidelink information when the sidelink information has no precedence over the uplink information.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the power allocation apparatus 1300 may further include other components or modules, and reference may be made to related techniques for particulars of these components or modules.

Furthermore, for the sake of simplicity, connection relationships between the components or modules or signal profiles thereof are only illustrated in FIG. 13. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the terminal equipment preferentially allocates power to the second uplink physical channel at least carrying the sidelink information when the sidelink transmission has precedence over the uplink transmission. Therefore, when the terminal equipment feeds back information to the network device, fairness of power allocation may be ensured, so that power may be preferentially allocated to the physical channel or physical signal with the most urgent demand or the highest degree of importance.

Embodiments of a Fifth Aspect

The embodiments of this disclosure provide a communication system, and reference may be made to FIG. 1, with contents identical to those in the embodiments of the first to the fourth aspects being not going to be described herein any further.

In some embodiments, the communication system 100 may at least include:

- a terminal equipment configured to determine whether sidelink transmission has precedence over uplink transmission, the sidelink transmission including transmission of sidelink information carried by a second uplink physical channel and/or transmission of a sidelink physical channel/signal, the uplink transmission including transmission of uplink information carried by the second uplink physical channel and/or transmission of a first uplink physical channel/signal, and allocate power preferentially for the second uplink physical channel and/or the sidelink physical channel/signal when the sidelink transmission has precedence over the uplink transmission.

In the embodiments of this disclosure, the transmission of the first uplink physical channel/signal does not carry sidelink information, the second uplink physical channel at least carries sidelink information, and the second uplink physical channel, the first uplink physical channel/signal and the sidelink physical channel/signal overlap temporally.

The embodiments of this disclosure further provide a network device, which may be, for example, a base station. However, this disclosure is not limited thereto, and it may also be another network device.

Figure 14:
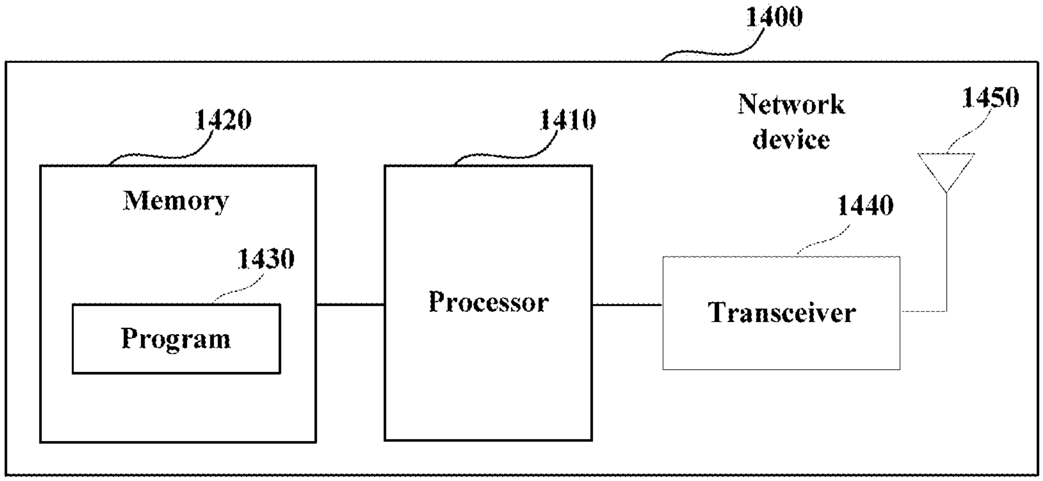
FIG. 14 is a schematic diagram of the network device of an embodiment of this disclosure.

FIG. 14 is a schematic diagram of a structure of the network device of the embodiment of this disclosure. As shown in FIG. 14, the network device 1400 may include a processor 1410 (such as a central processing unit (CPU)) and a memory 1420, the memory 1420 being coupled to the processor 1410. The memory 1420 may store various data, and furthermore, it may store a program 1430 for information processing, and execute the program 1430 under control of the processor 1410.

Furthermore, as shown in FIG. 14, the network device 1400 may include a transceiver 1440, and an antenna 1450, etc. Functions of the above components are similar to those in the relevant art, and shall not be described herein any further. It should be noted that the network device 1400 does not necessarily include all the parts shown in FIG. 14, and furthermore, the network device 1400 may include parts not shown in FIG. 14, and the relevant art may be referred to.

The embodiment of this disclosure further provides a terminal equipment; however, this disclosure is not limited thereto, and it may also be another equipment.

Figure 15:
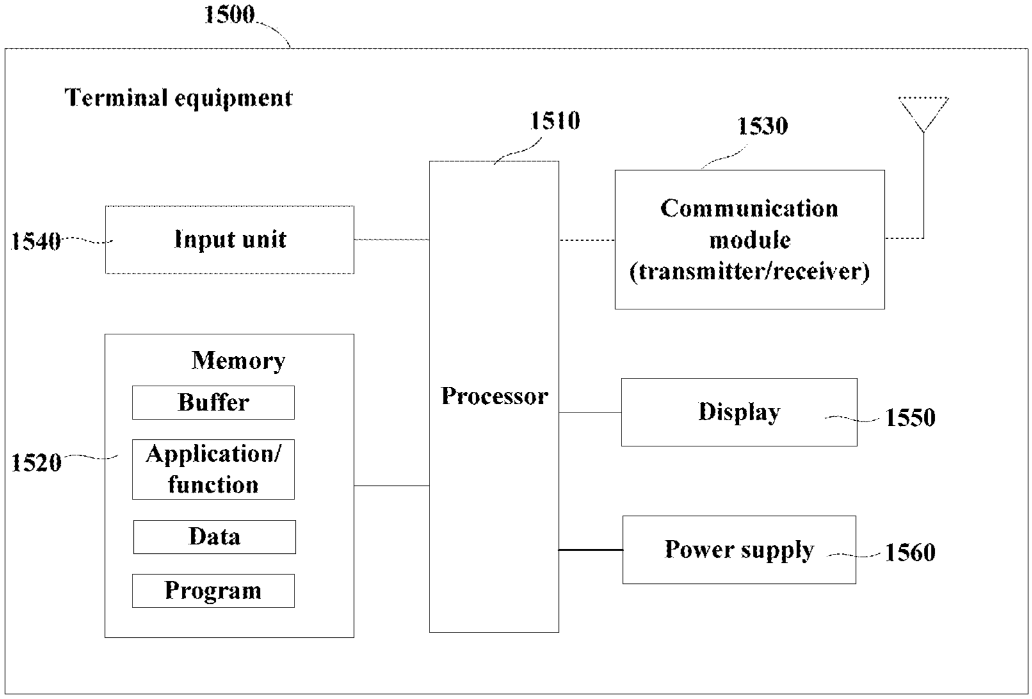
FIG. 15 is a schematic diagram of the terminal equipment of an embodiment of this disclosure.

FIG. 15 is a schematic diagram of the terminal equipment of the embodiment of this disclosure. As shown in FIG. 15, the terminal equipment 1500 may include a processor 1510 and a memory 1520, the memory 1520 storing data and a program and being coupled to the processor 1510. It should be noted that this figure is illustrative only, and other types of structures may also be used, so as to supplement or replace this structure and achieve a telecommunications function or other functions.

For example, the processor 1510 may be configured to execute a program to carry out the power allocation method as described in the embodiments of the first aspect. For example, the processor 1510 may be configured to perform the following control: determining whether sidelink transmission has precedence over uplink transmission, the sidelink transmission including transmission of sidelink information carried by a second uplink physical channel and/or transmission of a sidelink physical channel/signal, the uplink transmission including transmission of uplink information carried by the second uplink physical channel and/or transmission of a first uplink physical channel/signal; and allocating power preferentially for the second uplink physical channel and/or the sidelink physical channel/signal when the sidelink transmission has precedence over the uplink transmission.

The transmission of the first uplink physical channel/signal does not carry sidelink information, the second uplink physical channel at least carries sidelink information, and the second uplink physical channel, the first uplink physical channel/signal and the sidelink physical channel/signal overlap temporally.

For example, the processor 1510 may be configured to execute a program to carry out the data multiplexing method as described in the embodiments of the second aspect. For example, the processor 1510 may be configured to perform the following control: determining whether a code rate exceeds a permitted maximum code rate when sidelink information and uplink information are multiplexed to a second uplink physical channel; determining whether the sidelink information has precedence over the uplink information when the code rate exceeds the permitted maximum code rate, and discarding at least a part of the uplink information when the sidelink information has precedence over the uplink information, and discarding at least a part of the sidelink information when the sidelink information has no precedence over the uplink information.

As shown in FIG. 15, the terminal equipment 1500 may further include a communication module 1530, an input unit 1540, a display 1550, and a power supply 1560; functions of the above components are similar to those in the relevant art, which shall not be described herein any further. It should be noted that the terminal equipment 1500 does not necessarily include all the parts shown in FIG. 15, and the above components are not necessary. Furthermore, the terminal equipment 1500 may include parts not shown in FIG. 15, and the relevant art may be referred to.

An embodiment of this disclosure provides a computer program, which, when executed in a terminal equipment, will cause the terminal equipment to carry out the power allocation method as described in the embodiments of the first and the third aspects or the data multiplexing method as described in the embodiment of the second aspect.

An embodiment of this disclosure provides a storage medium, including a computer program, which will cause a terminal equipment to carry out the power allocation method as described in the embodiments of the first and the third aspects or the data multiplexing method as described in the embodiment of the second aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

As to implementations containing the above embodiments, following supplements are further disclosed.

Supplement 1. A power allocation method, including:

determining by a terminal equipment whether sidelink transmission has precedence over uplink transmission, the sidelink transmission including transmission of sidelink information carried by a second uplink physical channel and/or transmission of a sidelink physical channel/signal, the uplink transmission including transmission of uplink information carried by the second uplink physical channel and/or transmission of a first uplink physical channel/signal; and allocating power preferentially for the second uplink physical channel and/or the sidelink physical channel/signal when the sidelink transmission has precedence over the uplink transmission.

Supplement 2. The method according to supplement 1, wherein the transmission of the first uplink physical channel/signal carries no sidelink information, the second uplink physical channel at least carries sidelink information, and the second uplink physical channel, the first uplink physical channel/signal and the sidelink physical channel/signal overlap temporally.

Supplement 3. The method according to supplement 1 or 2, wherein the method further includes:

allocating power for the second uplink physical channel and/or the sidelink physical channel/signal according to a sidelink power allocation priority.

Supplement 4. The method according to supplement 1 or 2, wherein the method further includes:

allocating power preferentially for the first uplink physical channel/signal when the second uplink physical channel carries no uplink information and the sidelink transmission has no precedence over the uplink transmission.

Supplement 5. The method according to supplement 4, power is allocated for the first uplink physical channel/signal according to a sidelink power allocation priority.

Supplement 6. The method according to supplement 1 or 2, wherein the method further includes:

allocating power preferentially for the second uplink physical channel and/or the first uplink physical channel/signal when the second uplink physical channel carries uplink information and the sidelink transmission has no precedence over the uplink transmission.

Supplement 7. The method according to supplement 6, wherein the method further includes: allocating power for the second uplink physical channel and/or the first uplink physical channel/signal according to an uplink power allocation priority.

Supplement 8. The method according to any one of supplements 1-7, wherein a parameter used for determining whether the sidelink transmission has precedence over the uplink transmission at least includes a priority of the sidelink transmission and/or a priority of the uplink transmission.

Supplement 9. The method according to any one of supplements 1-8, wherein it is determined that the sidelink transmission has precedence over the uplink transmission when a highest priority of the sidelink transmission is higher than a first priority; otherwise, it is determined that the sidelink transmission has no precedence over the uplink transmission.

Supplement 10. The method according to any one of supplements 1-8, wherein it is determined that the sidelink transmission has precedence over the uplink transmission when a highest priority of the sidelink transmission is higher than a first priority and a highest priority of the uplink transmission is lower than or equal to a second priority; otherwise, it is determined that the sidelink transmission has no precedence over the uplink transmission.

Supplement 11. The method according to any one of supplements 1-8, wherein the sidelink information carried by the second uplink physical channel includes one or more bits of sidelink hybrid automatic repeat request feedback, and a priority of sidelink transmission of the second uplink physical channel is a highest priority in priorities of the one or more bits.

Supplement 12. The method according to supplement 11, wherein when a bit has an associated physical sidelink shared channel (PSSCH), the priority of the bit is equal to a priority of the PSSCH;

and when the bit does not have an associated physical sidelink shared channel (PSSCH), the bit has a lowest priority.

Supplement 13. The method according to any one of supplements 8-10, wherein the sidelink information carried by the second uplink physical channel includes sidelink channel state information (CSI), and a priority of sidelink transmission of the second uplink physical channel is a priority of the sidelink channel state information.

Supplement 14. The method according to any one of supplements 8-10, wherein the sidelink information carried by the second uplink physical channel includes sidelink channel state information (CSI) and one or more bits of sidelink hybrid automatic repeat request feedback, and a priority of sidelink transmission of the second uplink physical channel is a highest priority in priorities of the sidelink channel state information and the one or more bits.

Supplement 15. The method according to any one of supplements 1-14, wherein the second uplink physical channel is one of the following channels:

a physical uplink control channel carrying sidelink information (SL-PUCCH), a physical uplink shared channel carrying sidelink information (SL-PUSCH), a physical uplink control channel carrying sidelink information and uplink information (SL-UL-PUCCH), a physical uplink shared channel carrying sidelink information and uplink information (Uu information) (SL-UL-PUSCH).

Supplement 16. The method according to any one of supplements 1-15, wherein the method further includes:

determining by the terminal equipment whether a code rate exceeds a permitted maximum code rate when sidelink information and uplink information are multiplexed to the second uplink physical channel;

determining whether the sidelink information has precedence over the uplink information when the code rate exceeds the permitted maximum code rate; and discarding at least a part of the uplink information when the sidelink information has precedence over the uplink information.

Supplement 17. The method according to supplement 16, wherein the method further includes:

discarding at least a part of the sidelink information when the sidelink information has no precedence over the uplink information.

Supplement 18. The method according to any one of supplements 1-17, wherein the allocating power includes: allocating power for multiple physical channels or signals according to an order of priorities, or allocating power for one or more physical channels or signals with a highest priority.

Supplement 19. A data multiplexing method, including:

determining by a terminal equipment whether a code rate exceeds a permitted maximum code rate when sidelink information and uplink information are multiplexed to a second uplink physical channel;

determining whether the sidelink information has precedence over the uplink information when the code rate exceeds the permitted maximum code rate; and discarding at least a part of the uplink information when the sidelink information has precedence over the uplink information.

Supplement 20. The method according to supplement 19, wherein the method further includes:

discarding at least a part of the sidelink information when the sidelink information has no precedence over the uplink information.

Supplement 21. A terminal equipment, including a memory and a processor, the memory storing a computer program, and the processor being configured to execute the computer program to carry out the power allocation method as described in any one of supplements 1-18 or the data multiplexing method as described in supplement 19 or 20.

What is claimed is:

1. A power allocation apparatus, configured in a terminal equipment, wherein the apparatus comprises:

a memory that stores a plurality of instructions; and processor circuitry coupled to the memory and configured to execute the instructions to:

generate an acknowledgement (ACK) in a case where a physical sidelink shared channel (PSSCH) is not transmitted on one or more resources provided by a configured grant; wherein for the configured grant, the terminal equipment is provided with a physical uplink control channel (PUCCH) resource to report hybrid automatic repeat request acknowledgement (HARQ-ACK) information; and transmit the acknowledgement (ACK) to a base station by using a PUCCH on the provided PUCCH resource, wherein a priority of the acknowledgement (ACK) is the lowest priority, and a priority value of the acknowledgement (ACK) is same as the largest priority value among possible priority values for the configured grant.

2. The apparatus according to claim 1, wherein a larger priority value is corresponding to a lower priority.

3. The apparatus according to claim 1, wherein the processor circuitry is further configured to determine whether sidelink transmission has precedence over uplink transmission, the sidelink transmission comprising at least one of transmission of sidelink information carried by a second uplink physical channel and transmission of a sidelink physical channel/signal, the uplink transmission comprising at least one of transmission of uplink information carried by the second uplink physical channel and transmission of a first uplink physical channel/signal carrying no sidelink information; wherein the second uplink physical channel at least carries sidelink information, the second uplink physical channel, the first uplink physical channel/signal and the sidelink physical channel/signal overlap in a time domain; and allocate power preferentially for at least one of the second uplink physical channel and the sidelink physical channel/signal when the sidelink transmission has precedence over the uplink transmission.

4. The apparatus according to claim 3, wherein the processor circuitry is further configured to allocate power for at least one of the second uplink physical channel and the sidelink physical channel/signal according to a sidelink power allocation priority.

5. The apparatus according to claim 3, wherein the processor circuitry is further configured to allocate power preferentially for the first uplink physical channel/signal when the second uplink physical channel carries no uplink information and the sidelink transmission has no precedence over the uplink transmission.

6. The apparatus according to claim 5, wherein the processor circuitry is further configured to allocate power for the first uplink physical channel/signal according to a sidelink power allocation priority.

7. The apparatus according to claim 3, wherein the processor circuitry is further configured to allocate power preferentially for at least one of the second uplink physical channel and the first uplink physical channel/signal when the second uplink physical channel carries uplink information and the sidelink transmission has no precedence over the uplink transmission.

8. The apparatus according to claim 7, wherein the processor circuitry is further configured to allocate power for at least one of the second uplink physical channel and the first uplink physical channel/signal according to an uplink power allocation priority.

9. The apparatus according to claim 3, wherein a parameter used for determining whether the sidelink transmission has precedence over the uplink transmission at least comprises at least one of a priority of the sidelink transmission and a priority of the uplink transmission.

10. The apparatus according to claim 9, wherein the processor circuitry is configured to determine that the sidelink transmission has precedence over the uplink transmission when a highest priority of the sidelink transmission is higher than a first priority; otherwise, determine that the sidelink transmission has no precedence over the uplink transmission.

11. The apparatus according to claim 9, wherein the processor circuitry is configured to determine that the sidelink transmission has precedence over the uplink transmission when a highest priority of the sidelink transmission is higher than a first priority and a highest priority of the uplink transmission is lower than or equal to a second priority; otherwise, determine that the sidelink transmission has no precedence over the uplink transmission.

12. The apparatus according to claim 9, wherein the sidelink information carried by the second uplink physical channel comprises one or more bits of sidelink hybrid automatic repeat request feedback, and a priority of sidelink transmission of the second uplink physical channel is a highest priority in priorities of the one or more bits.

13. The apparatus according to claim 12, wherein when a bit has an associated physical sidelink shared channel, the priority of the bit is equal to a priority of the physical sidelink shared channel, and when the bit does not have an associated physical sidelink shared channel, the bit has a lowest priority.

14. The apparatus according to claim 9, wherein the sidelink information carried by the second uplink physical channel comprises sidelink channel state information, and a priority of sidelink transmission of the second uplink physical channel is a priority of the sidelink channel state information.

15. The apparatus according to claim 9, wherein the sidelink information carried by the second uplink physical channel comprises sidelink channel state information and one or more bits of sidelink hybrid automatic repeat request feedback, and a priority of sidelink transmission of the second uplink physical channel is a highest priority in priorities of the sidelink channel state information and the one or more bits.

16. The apparatus according to claim 3, wherein the second uplink physical channel is one of the following channels: a physical uplink control channel carrying sidelink information, a physical uplink shared channel carrying sidelink information, a physical uplink control channel carrying sidelink information and uplink information, or a physical uplink shared channel carrying sidelink information and uplink information.

17. The apparatus according to claim 3, wherein the processor circuitry is further configured to:

determine whether a code rate exceeds a permitted maximum code rate when sidelink information and uplink information are multiplexed to the second uplink physical channel, determine whether the sidelink information has precedence over the uplink information when the code rate exceeds the permitted maximum code rate, and discard at least a part of the uplink information when the sidelink information has precedence over the uplink information.

18. The apparatus according to claim 17, wherein the processor circuitry is further configured to:

discard at least a part of the sidelink information when the sidelink information has no precedence over the uplink information.

19. A power allocation method, comprising:

generating, by a terminal equipment, an acknowledgement (ACK) in a case where a physical sidelink shared channel (PSSCH) is not transmitted on one or more resources provided by a configured grant; wherein for the configured grant, the terminal equipment is provided with a physical uplink control channel (PUCCH) resource to report hybrid automatic repeat request acknowledgement (HARQ-ACK) information; and transmitting, by the terminal equipment, the acknowledgement (ACK) to a base station by using a PUCCH on the provided PUCCH resource, wherein a priority of the acknowledgement (ACK) is the lowest priority, and a priority value of the acknowledgement (ACK) is same as the largest priority value among possible priority values for the configured grant.

20. A communication system, comprising:

a terminal equipment configured to:

generate an acknowledgement (ACK) in a case where a physical sidelink shared channel (PSSCH) is not transmitted on one or more resources provided by a configured grant; wherein for the configured grant, the terminal equipment is provided with a physical uplink control channel (PUCCH) resource to report hybrid automatic repeat request acknowledgement (HARQ-ACK) information; and transmit the acknowledgement (ACK) to a base station by using a PUCCH on the provided PUCCH resource, wherein a priority of the ACK is the lowest priority, and a priority value of the acknowledgement (ACK) is same as the largest priority value among possible priority values for the configured grant.

* * * * *